United States Patent [19]
Madden et al.

[11] Patent Number: 5,397,976
[45] Date of Patent: Mar. 14, 1995

[54] CONTROL SYSTEM FOR VOLTAGE CONTROLLED BILATERAL CURRENT SOURCE

[75] Inventors: George Madden, San Francisco; Bruce Kimball, Fremont, both of Calif.

[73] Assignee: Space Systems/Loral, Inc., Palo Alto, Calif.

[21] Appl. No.: 127,824

[22] Filed: Sep. 28, 1993

[51] Int. Cl.[6] .................................................. G05F 1/10
[52] U.S. Cl. ..................................... 323/222; 323/282
[58] Field of Search ............... 323/222, 223, 224, 232, 323/282, 285, 906; 363/123, 124

[56] References Cited

U.S. PATENT DOCUMENTS

| | | | |
|---|---|---|---|
| 4,395,675 | 7/1983 | Toumani | 323/271 |
| 4,430,608 | 2/1984 | Nesler | 323/282 |
| 4,618,812 | 10/1986 | Kawakami | 323/224 |
| 4,695,785 | 9/1987 | Mieth et al. | 323/222 |
| 4,837,495 | 6/1989 | Zansky | 323/222 |
| 4,873,480 | 10/1989 | Lafferty | 323/906 |
| 4,974,141 | 11/1990 | Severinsky | 323/224 |
| 5,138,249 | 8/1992 | Capel | 323/283 |
| 5,247,239 | 9/1993 | Yamamura et al. | 323/222 |
| 5,270,636 | 12/1993 | Lafferty | 323/222 |

*Primary Examiner*—Steven L. Stephan
*Assistant Examiner*—Matthew V. Nguyen
*Attorney, Agent, or Firm*—Perman & Green

[57] ABSTRACT

A power converter (10) functions as a voltage controlled current source with bilateral current capability. When a control voltage is above a prescribed potential, the output current is positive (flowing to a Source Bus (11)), and when the control voltage is below the prescribed potential the output current is negative (flowing from the Source Bus). An additional feature of the controller is an inherent ability to limit a maximum current in either direction. In operation, the power converter functions to regulate a current flowing to the Source Bus from a Battery Bus (13) to satisfy the existing load requirements and, also, functions to charge batteries at a predetermined charge limit, as set by a CURRENT REFERENCE signal, for current flowing from the Source Bus to the Battery Bus.

19 Claims, 3 Drawing Sheets

FIG. 3
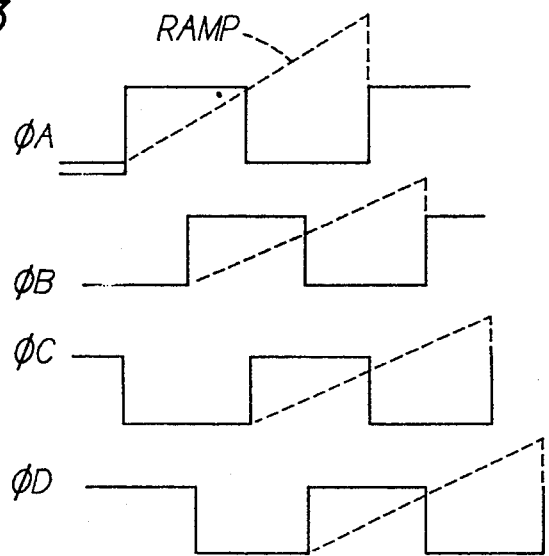
FIG. 4a
OUTPUT OF A1
FIG. 4b
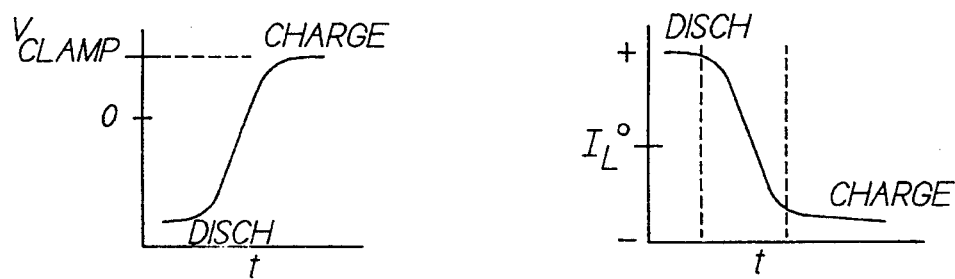
FIG. 4c
OUTPUT OF A2
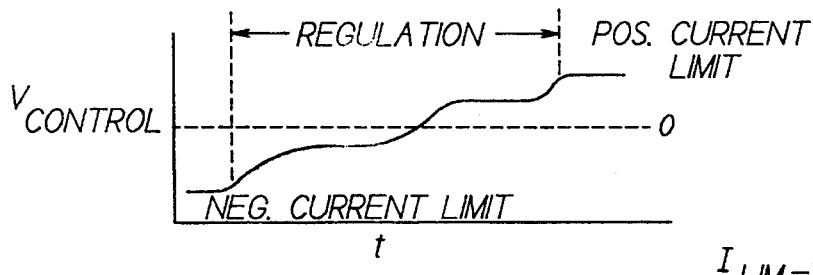
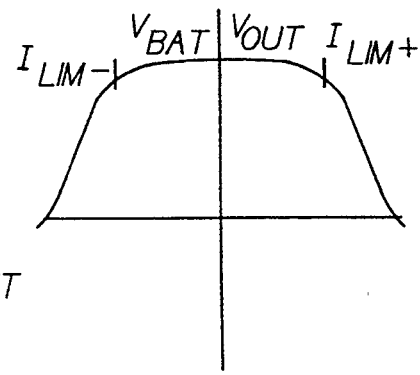
FIG. 4d
$V_{BAT} > V_{OUT}$

CONTROL SYSTEM FOR VOLTAGE CONTROLLED BILATERAL CURRENT SOURCE

The invention described herein is a subject invention under U.S. Government contract No. NAS3-25082, Subcontract No. R8OSIA88561105, and as such the U.S. Government may have rights therein.

FIELD OF THE INVENTION

This invention relates generally to power conversion apparatus and, in particular, relates to control circuitry for current mode controlled power converters.

BACKGROUND OF THE INVENTION

Current mode controlled power converters may be embodied in a unilateral or a bilateral topology wherein a forcing function, or power source, can be placed at either end of the converter. That is, the load and the source may be interchanged. As a result, in a bilateral power converter topology the current may pass through the converter in either direction.

As an example, in a satellite bilateral battery charge and discharge system power may be drawn from a battery, or supplied to the battery from a solar array source. Conventional control topologies for such systems employ from two to four separate control loops to control the current (variable 1) and to simultaneously output a voltage (variable 2). However, the use of multiple control loops adds complexity, cost, weight, and increases the power consumption to the system, all of which are disadvantageous, especially in a power conversion system designed for use on a space-based platform.

OBJECTS OF THE INVENTION

It is thus an object of this invention to provide a control system for a power converter that employs but a single control loop, having a single current summing point, to simultaneously maintain control of the current variable and the voltage variable.

It is another object of this invention to provide a control system for a power converter that inherently provides current limiting in a bilateral mode of operation, without requiring the use of additional current limiting networks.

SUMMARY OF THE INVENTION

The foregoing and other problems are overcome and the objects of the invention are realized by a control system for a power converter that regulates an output voltage regardless of the direction of current flow. A feature of the invention is the provision of a current regulator having a single sensing of an inductor current and a single current regulation loop to control the current at all times, regardless of the direction of current flow through the inductor.

The controller of the invention functions as a voltage controlled current source with bilateral current capability. When a control voltage is greater than a predetermined potential the output current is positive (flowing to a Source Bus), and when the control voltage is less than the predetermined potential the output current is negative (flowing from the Source Bus). An additional feature of the controller of the invention is an inherent ability to limit a maximum current in either direction by limiting the range of the control voltage.

In operation, the power conversion circuit of invention functions to regulate a current flowing to the Source Bus from a Battery Bus to satisfy the existing load requirements and, also, functions to charge the batteries at a predetermined charge limit, as set by a CURRENT REFERENCE signal, for current flowing from the Source Bus to the Battery Bus.

BRIEF DESCRIPTION OF THE DRAWING

The above set forth and other features of the invention are made more apparent in the ensuing Detailed Description of the Invention when read in conjunction with the attached Drawing, wherein:

FIG. 3 is timing diagram that illustrates the relationship of the power switching signals of FIG. 2; and FIGS. 4a–4d are waveforms that illustrate in greater detail certain aspects of the operation of the control system of the invention.

DETAILED DESCRIPTION OF THE INVENTION

Figure 1:
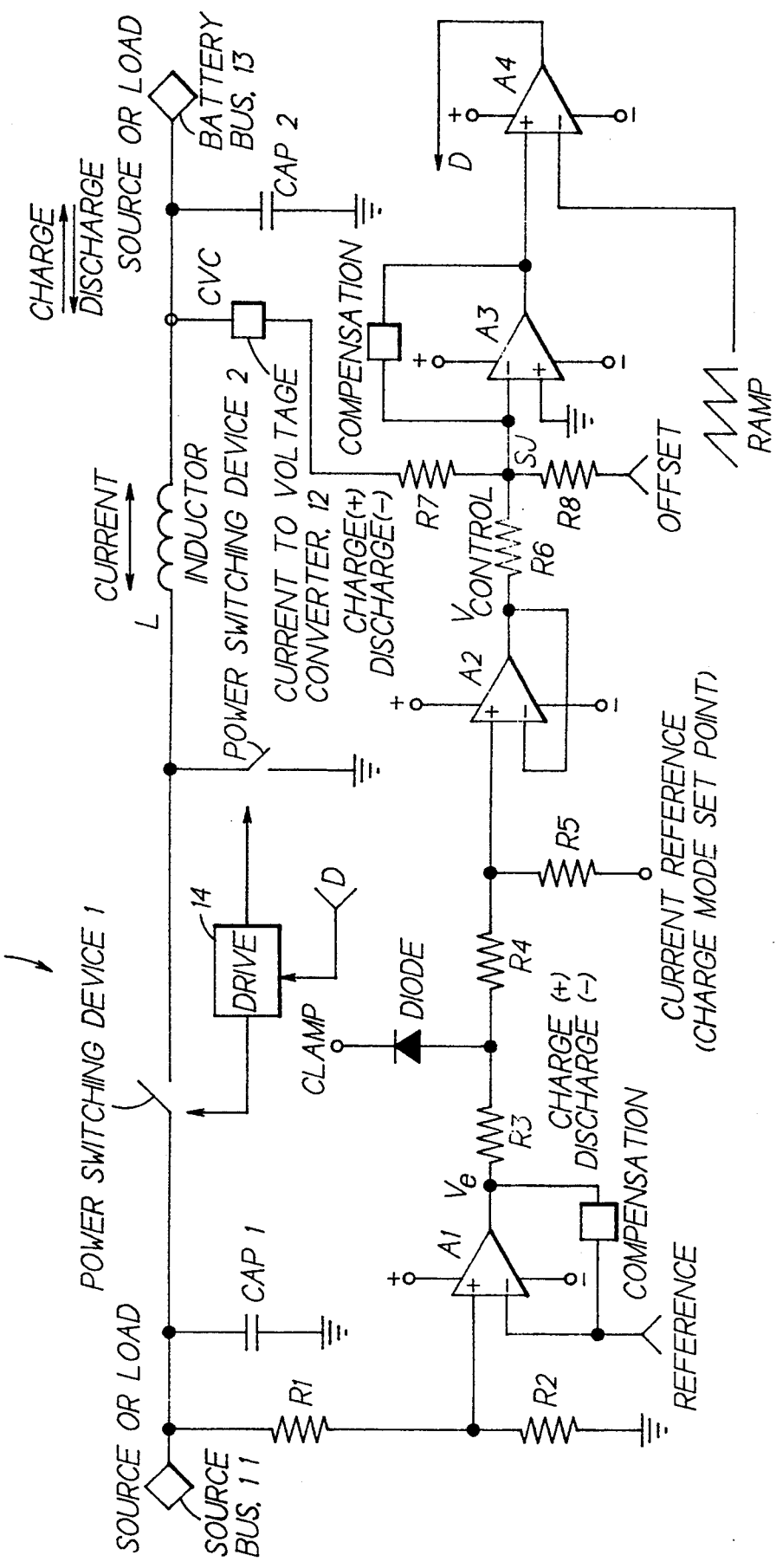
FIG. 1 is a simplified block diagram of a single loop power conversion control system that is constructed and operated in accordance with the invention.

FIG. 1 illustrates a power converter 10 that includes the control system of the invention. A first end of the converter 10 is coupled to a Source Bus 11 and a second end is coupled to a Battery Bus 13. During operation, the Source Bus 11 is typically coupled to a solar array (not shown) that provides, when illuminated, electrical power to the Source Bus 11. In general, when the solar array is fully illuminated, current is sourced from the Source Bus 11, through the converter 10, to the Battery Bus 13 to charge the system batteries (not shown). During periods of non-illumination of the solar array the system batteries (not shown) source power from the Battery Bus 13, through the converter 10 (where the power is suitably regulated), and to the Source Bus 11 to provide required electrical power to other components that are coupled to the Source Bus 11.

A first amplifier (A1) has a noninverting input (+) coupled to the Source Bus 11 through a voltage divider comprised of resistors R1 and R2. A1 includes a frequency compensation network that is coupled from the output to an inverting input (−), which is further coupled to a reference signal (REFERENCE). A1 operates to subtract the magnitude of REFERENCE from the magnitude of the signal appearing at the junction of R1 and R2, and develops an error voltage Ve as a first component of a first control signal. A1 has a bipolar output such that, when the battery is supplying current to the Source Bus 11, the magnitude of Ve is negative and, conversely, when the battery is being charged from the Source Bus 11, the magnitude of Ve is positive. A DIODE is provided to clamp the positive excursion of Ve at a predetermined positive level.

Ve is supplied through serially coupled resistors R3 and R4 to a second amplifier A2. Also coupled to the input of A2 is a Current Reference signal that is provided through resistor R5. The Current Reference signal forms a second component of the first control signal and has a value selected to set a maximum battery charging set point during the time that the output of A1 is clamped by the DIODE. A2 is configured as a voltage follower and provides an output $V_{CONTROL}$, through R6, to a summing junction SJ at an inverting input of a third amplifier, specifically an error amplifier (A3). A3 includes a frequency compensation network that is coupled between the output and the inverting input.

The output of amplifier A2 thus provides a reference signal for A3. A second input to the summing junction at the input of A3 is a second control signal provided from an output of a current to voltage converter (CVC) 12. The output of the CVC 12 is either positive or negative, depending on the direction of current flow through an inductor (L), and has a magnitude that is a function of the magnitude of the current flow through the inductor L. The output of the CVC 12 is supplied to the summing junction at the input of error amplifier A3 through a resistor R7 and, in operation, will be opposite in polarity to the reference signal supplied at the output of A2. As such, the amplifier A3 seeks to null the output of A2 with the output of the CVC 12 by driving a fourth amplifier A4 which functions as a pulsewidth modulator (PWM). A4 is configured as a voltage comparator and receives a saw tooth ramp signal (RAMP) at an inverting input. The output of A4 is a pulsewidth modulated signal wherein the pulsewidth is determined by the magnitude of the signal at the output of A3. The output of A4 (D) is provided to an input of a DRIVE circuit 14 which alternately energizes a first power switching device (PSD1) and a second power switching device (PSD2).

During a time that current flows from the Source Bus 11 to the Battery Bus 13, thereby charging the batteries, the power switching devices are operated in a buck configuration, and during a time that current flows from the Battery Bus 13 to the Source Bus 11 the power switching devices are operated in a boost configuration. The PSD1 is the circuit buck switch, and the PSD2 is the circuit boost switch. Both of these switches are preferably implemented with FET transistors having internal parallel diodes for commutating switching transients.

As such, A4 is responsive to the output of A3 to vary the on and off times of the PSDs 1 and 2 and to thereby vary the current flowing through the inductor L. The current is varied in the inductor L so as to null, at the summing junction coupled to the inverting input of A3, the reference voltage supplied at the output of A2 and the current feedback signal supplied by the CVC 12. An OFFSET signal is also provided to the summing junction SJ through R8 and establishes a nominal pulsewidth at the output of A4. Capacitors 1 and 2 function in a conventional manner and operate as filter capacitors.

As can be seen, current feedback is provided through the CVC 12 while voltage feedback is provided by the R1, R2 divider network. In a presently preferred embodiment of the invention, the ratio of R1 to R2 is 13:1.

In operation, the circuit of FIG. 1 functions to regulate the current flowing to the Source Bus 11 from the Battery Bus 13 to satisfy the existing load requirements and, also, functions to charge the batteries at a predetermined charge limit, as set by the CURRENT REFERENCE signal, for current flowing from the Source Bus 11 to the Battery Bus 13.

The configuration shown in FIG. 1 provides a single current regulator topology. However, in that a single current regulator may not be capable of supplying the required maximum source and battery currents, the teaching of the invention is extendable to a system having a plurality of paralleled current regulators.

Figure 2:
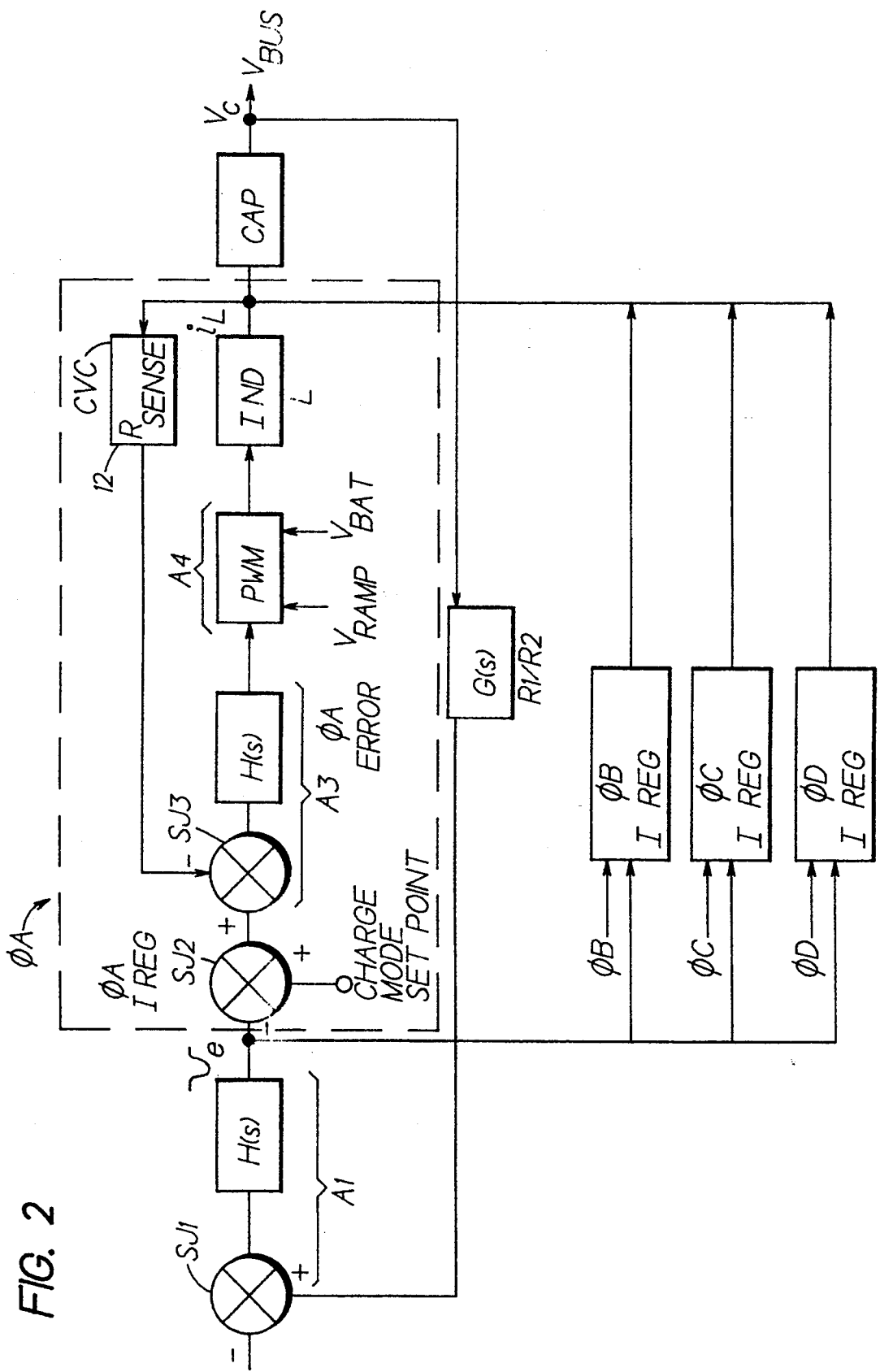
FIG. 2 is block diagram that illustrates in greater detail the operation of the control system of FIG. 1.

As shown in FIG. 2, the current regulator of FIG. 1 is designated as ØA IREG, and is paralleled with three additional current regulators designated ØB IREG-ØD IREG. In FIG. 2 the amplifier A1 is represented by the summing junction (SJ1) and also the block H(S), which represents the frequency compensation network that is coupled between the output and the inverting input. The Current Reference input that is coupled through R5 in FIG. 1 is shown coupled to the summing junction SJ2. For clarity in FIG. 2, the voltage follower A2 is not shown. The ØA IREG includes the amplifier A3, which is represented with the summing junction (SJ3) and the compensation network H(S) that is coupled between the output and the non-inverting input. The comparator A4 is designated by the block PWM. Block PWM has an output coupled, via the DRIVER 14 and PSDs 1 and 2 (not shown in FIG. 2) to the inductor L. The inductor current feedback block $R_{SENSE}$ corresponds to the CVC 12 of FIG. 1. Voltage feedback is represented by the Block G(s), which corresponds to the R1/R2 voltage divider. Each of the paralleled current regulators ØB-ØD IREG is constructed in a manner shown for the current regulator ØA IREG. That is, each includes SJ2, A3, A4, L, DRIVER 14, PSDs 1 and 2, and the CVC 12.

Each of the current regulators receives a timing signal (ØA-ØD, respectively) having a relationship shown in FIG. 3. As can be seen in FIG. 3, each of the Ø signals is 90° out of phase with the preceding signal. In a presently preferred embodiment of the invention, each timing signal has a frequency (f) of 80 Khz.

It can be seen in FIG. 2 that the output of amplifier A1 is common to the four current regulators ØA-ØD. As such, in that there are five variables present in the system of FIG. 2, that is, one output voltage and four currents, the system of FIG. 2 includes five error amplifiers. Specifically, the single amplifier A1 is the error amplifier for the Source Bus 11 voltage, and the amplifier A3 contained within each of the IREG blocks is the error amplifier for the associated parallel branch current.

In summary, a control system has been presented that regulates an output voltage regardless of the direction of current flow in the output. A feature of the invention is the provision of a current regulator having a single sensing of an inductor current and a single current regulation loop to control the current at all times, regardless of the direction of current flow through the inductor. As such, the system of the invention functions as a voltage controlled current source with bilateral current capability. When the control voltage is above a prescribed zero current potential, the output current is positive (flowing to the Source Bus 11), and when the control voltage is below the prescribed zero current potential the output current is negative (flowing from the Source Bus 11).

It should be noted that an additional feature of the control system of the invention is an ability to limit a maximum current in either direction. This achieved through the limitations placed on the maximum excursions at the output of the amplifier A1, wherein a positive excursion is limited by the clamping DIODE, and a negative excursion is limited by the negative power supply rail. If desired, a negative clamping diode may also be employed to limit the negative excursion of the output of A1 to a predetermined negative potential.

It is noted that this feature of the invention is converter topology-dependent. For example, for a Boost topology $V_{SOURCE\ BUS}$ is greater than $V_{BATTERY\ BUS}$.

FIG. 4a shows the output of A1 for the discharge and the charge condition. As can be seen, during the charge condition, the positive excursion of the voltage error signal is clamped at $V_{clamp}$, and the charging current reference point is set by the Current Reference signal that is supplied through R5. FIG. 4b shows the corresponding magnitude of the inductor current $I_L$ for the discharge and the charge condition. FIG. 4c shows the output of amplifier A2 between a negative current limit and a positive current limit condition. Between the negative and positive current limits the circuit 10 regulates the voltage and current in the manner described above. FIG. 4d shows the inherent current limiting capability of the system 10 for a condition wherein the battery voltage is greater than the output voltage at the Source Bus 11. As can be seen, at the plus and minus current limit points the output voltage drops quickly to a minimum, indicating a current limited condition. For the graph of FIG. 4d to be valid, the potential at the Battery Bus 13 must exceed the potential at the Source Bus 11 by at least one diode drop, in that the internal commutating diode within the PSD 1 will otherwise become forward biased.

It should be noted that the illustrated embodiments are not intended to be read in a limiting sense upon the practice of the invention. That is, the teaching of the invention may be employed in applications other than a battery charging/discharging power system. Furthermore, more or less than the four paralleled current regulators of FIG. 2 may be employed. Also, circuit configurations other than those specifically illustrated may be employed.

Thus, while the invention has been particularly shown and described with respect to preferred embodiments thereof, it will be understood by those skilled in the art that changes in form and details may be made therein without departing from the scope and spirit of the invention.

What is claimed is:

1. A voltage controlled bilateral current source, comprising:

an inductance having a first terminal for coupling to a first power bus and a second terminal for coupling to a second power bus;

switching means coupled to said inductance for varying a magnitude and a direction of current flow through said inductance; and switching means control means having an output signal coupled to said switching means for operating said switching means so as to source current from the first bus and sink current to the second bus, or to source current from the second bus and sink current to the first bus, said control means being responsive to a first signal having a first component that has a magnitude and a polarity that is a function of a voltage potential appearing at said first bus, said control means further being responsive to a second signal that has a magnitude and a polarity that is a function of the magnitude of the current flow and the direction of the current flow through said inductance, said control means including means for generating said output signal so as to null said first signal with said second signal.

2. A voltage controlled bilateral current source as set forth in claim 1 wherein said first signal includes a second component having a magnitude for setting a maximum level of the current flow through said inductance when said switching means is operated to source current from the first bus and sink current to the second bus.

3. A voltage controlled bilateral current source as set forth in claim 2 wherein said second bus has a battery coupled thereto, and wherein said second component has a magnitude for setting a maximum charging current for the battery.

4. A voltage controlled bilateral current source as set forth in claim 2 and further including clamping means for limiting a maximum excursion of said first component when said switching means is operated to source current from the first bus and sink current to the second bus so that said second component is enabled to set the maximum current flow through said inductance.

5. A voltage controlled bilateral converter as set forth in claim 1 wherein said control means provides a maximum inductor current in accordance with a maximum excursion of said first component.

6. A power conversion apparatus, comprising:

a plurality of current regulator means coupled in parallel with one another between a first power bus and a second power bus; each of said current regulator means including, an inductance having a first terminal for coupling to the first power bus and a second terminal for coupling to the second power bus;

switching means coupled to said inductance for varying a magnitude and a direction of current flow through said inductance; and switching means control means having an output signal coupled to said switching means for operating said switching means so as to source current from the first bus and sink current to the second bus, or to source current from the second bus and sink current to the first bus, said control means being responsive to a first signal having a first component that has a magnitude and a polarity that is a function of a voltage potential appearing at said first bus, said control means further being responsive to a second signal that has a magnitude and a polarity that is a function of the magnitude of the current flow and the direction of the current flow through said inductance, said control means including means for generating said output signal so as to null said first signal with said second signal.

7. A power conversion apparatus as set forth in claim 6 wherein said first component of said first signal is generated by means external to said plurality of current regulator means, and is supplied in common to each of said plurality of current regulator means.

8. A power conversion apparatus as set forth in claim 7 wherein said first signal includes a second component having a magnitude for setting a maximum level of the current flow through said inductance when said switching means is operated to source current from the first bus and sink current to the second bus, and wherein said second component is provided locally within each of said plurality of current regulator means.

9. A power conversion apparatus as set forth in claim 8 wherein said second bus has a battery coupled thereto, and wherein said second component has a magnitude for setting a maximum charging current for the battery.

10. A power conversion apparatus as set forth in claim 8, wherein each of said plurality of current regulator means further includes clamping means for limiting a maximum excursion of said first component when said switching means is operated to source current from the first bus and sink current to the second bus so that said second component is enabled to set the maximum current flow through said inductance.

11. A power conversion apparatus as set forth in claim 6 wherein said control means of each of said plurality of current regulator means provides a maximum inductor current in accordance with a maximum signal excursion of said first component.

12. A power conversion apparatus as set forth in claim 6 wherein each of said control means receives a synchronizing clock signal for controlling a frequency at which said output signal is generated, and wherein said clock signals are offset from one another by 90°.

13. A power conversion apparatus as set forth in claim 12 and including a pulse width modulation means for generating said output signal.

14. A power converter interposed between a first power bus of a satellite and a second power bus of the satellite, said first power bus being coupled to an energy source means and said second power bus being coupled to an energy storage means, comprising:

at least one inductance having a first terminal for coupling to the first power bus and a second terminal for coupling to the second power bus;

switching means coupled to said at least one inductance for varying a magnitude and a direction of current flow through said at least one inductance; and switching means control means having an output signal coupled to said switching means for operating said switching means so as to source current from the first power bus and sink current to the second power bus, or to source current from the second power bus and sink current to the first power bus, said control means being responsive to a first signal having a first component that has a magnitude and a polarity that is a function of a voltage potential appearing at said first power bus, said control means further being responsive to a second signal that has a magnitude and a polarity that is a function of the magnitude of the current flow and the direction of the current flow through said at least one inductance, said control means including means for generating said output signal so as to null said first signal with said second signal.

15. A power converter as set forth in claim 14 wherein said first signal includes a second component having a magnitude for setting a maximum level of the current flow through said at least one inductance when said switching means is operated to source current from the first power bus and sink current to the second power bus.

16. A power converter as set forth in claim 15 wherein said energy storage means is comprised of a battery, and wherein said second component has a magnitude for setting a maximum charging current for the battery.

17. A power converter as set forth in claim 15 and further including clamping means for limiting a maximum excursion of said first component when said switching means is operated to source current from the first power bus and sink current to the second power bus so that said second component is enabled to set the maximum current flow through said at least one inductance.

18. A power converter as set forth in claim 14 wherein said energy source means is comprised of at least one solar panel.

19. A switching bi-lateral power converter interposed between a first power bus and a second power bus, comprising:

an inductance having a first terminal coupled to the first power bus and a second terminal coupled to the second power bus;

switching means coupled to said inductance for varying a magnitude and a direction of current flow through said inductance;

means coupled to the first power bus for generating a first signal having a polarity that indicates the direction of current flow through the inductance and a magnitude that indicates a voltage potential of the first power bus;

means coupled to the inductance for generating a second signal having a polarity that indicates the direction of current flow through the inductance and a magnitude that indicates the magnitude of the current flow through said inductance; and means having inputs coupled to the first signal and to the second signal for generating an output signal for controlling, in a first mode of operation, said switching means to regulate a current flowing to the first power bus to satisfy an existing load requirement and, in a second mode of operation, to provide a current flowing to the second power bus at a predetermined current limit.

* * * * *